United States Patent
Zaman et al.

(10) Patent No.: US 11,858,614 B2
(45) Date of Patent: Jan. 2, 2024

(54) AIRCRAFT THERMAL ACOUSTIC INSULATION BLANKET

(71) Applicant: The Boeing Company, Chicago, IL (US)

(72) Inventors: Arif Zaman, Mukilteo, WA (US); Khashayar Borumand, Woodinville, WA (US); Daniel B. Slaton, Renton, WA (US)

(73) Assignee: The Boeing Company, Chicago, IL (US)

( * ) Notice: Subject to any disclaimer, the term of this patent is extended or adjusted under 35 U.S.C. 154(b) by 423 days.

(21) Appl. No.: 15/911,014

(22) Filed: Mar. 2, 2018

(65) Prior Publication Data

US 2019/0270506 A1    Sep. 5, 2019

(51) Int. Cl.
*B64C 1/40* (2006.01)
*B32B 5/02* (2006.01)

(52) U.S. Cl.
CPC .............. *B64C 1/40* (2013.01); *B32B 5/02* (2013.01); *B32B 2250/05* (2013.01); *B32B 2250/40* (2013.01); *B32B 2262/101* (2013.01); *B32B 2307/102* (2013.01); *B32B 2307/304* (2013.01); *B32B 2605/08* (2013.01)

(58) Field of Classification Search
CPC ..................................... B64C 1/40; B32B 5/02
See application file for complete search history.

(56) References Cited

U.S. PATENT DOCUMENTS

| | | | | |
|---|---|---|---|---|
| 2,720,269 | A * | 10/1955 | Diacos ..................... | A62C 8/06 169/50 |
| 5,435,679 | A | 7/1995 | Barry | |
| 5,811,167 | A * | 9/1998 | Norvell ................... | B29C 65/02 428/76 |
| 6,358,591 | B1 | 3/2002 | Smith | |
| 6,551,951 | B1 | 4/2003 | Fay et al. | |
| 2003/0148693 | A1* | 8/2003 | Erb, Jr. .................... | B32B 5/26 442/391 |
| 2006/0046598 | A1 | 3/2006 | Shah | |
| 2010/0021268 | A1* | 1/2010 | Dean ...................... | F16B 43/00 411/542 |
| 2011/0094826 | A1* | 4/2011 | Richardson, III .... | B32B 27/365 181/294 |
| 2011/0274863 | A1* | 11/2011 | Busch .................... | C09D 5/185 428/41.7 |
| 2012/0273618 | A1 | 11/2012 | Fernando et al. | |

(Continued)

FOREIGN PATENT DOCUMENTS

| | | |
|---|---|---|
| JP | 2011501707 A | 1/2011 |
| WO | 200952015 A2 | 4/2009 |

OTHER PUBLICATIONS

"Installation of Thermal/Acoustic Insulation for Burnthrough Protection," Advisory Circular, U.S. Department of Transportation: Federal Aviation Administration, dated Jul. 29, 2008, 35 pages.

(Continued)

*Primary Examiner* — Alicia J Weydemeyer
*Assistant Examiner* — Laura B Figg
(74) *Attorney, Agent, or Firm* — Yee & Associates, P.C.

(57) ABSTRACT

A thermal acoustic insulation blanket is presented. The thermal acoustic insulation blanket comprises a composite laminate forming a burn through layer.

20 Claims, 5 Drawing Sheets

(56) References Cited

U.S. PATENT DOCUMENTS

2012/0276368 A1* 11/2012 Fernando ............... B64C 1/066
428/319.1
2013/0045352 A1   2/2013 Kern et al.

OTHER PUBLICATIONS

Canadian Intellectual Property Office Examination Search Report, dated Mar. 22, 2022, regarding Application No. CA3,033,021, 4 pages.
China Intellectual Property Office, Office Action with English Translation, dated Dec. 15, 2022, regarding Application No. CN201910153966.1, 13 pages.
Japan Patent Office Notice of Reasons for Rejection and English Translation, dated Jun. 27, 2023, regarding Application No. JP2019-033455, 10 pages.
Japan Patent Office Notice of Reasons for Rejection and Partial Translation, dated Jan. 10, 2023, regarding Application No. JP2019-033455, 12 pages.

* cited by examiner

AIRCRAFT THERMAL ACOUSTIC INSULATION BLANKET

BACKGROUND INFORMATION

1. Field

The present disclosure relates generally to thermal acoustic insulation blankets for aircraft. More specifically, the present disclosure relates to thermal acoustic insulation blankets having increased rigidity.

2. Background

In aircraft, insulation blankets are used across the fuselage to reduce noise and insulate against extreme temperatures. These insulation blankets may be referred to as aircraft thermal acoustic insulation blankets.

The thermal acoustic insulation blankets also provide a moisture barrier for the aircraft. The thermal acoustic insulation blankets in the bottom of an aircraft provide drainage paths for moisture. To provide drainage paths for moisture, space is present between the thermal acoustic insulation blankets and the skin of the fuselage.

Over the course of installation and operation, the shape of the thermal acoustic insulation blankets may change. For example, the thermal acoustic insulation blankets may sag or contact the fuselage. When the thermal acoustic insulation blankets sag, drainage paths may be impeded.

Therefore, it would be desirable to have a method and apparatus that take into account at least some of the issues discussed above, as well as other possible issues.

SUMMARY

An illustrative embodiment of the present disclosure provides a thermal acoustic insulation blanket. The thermal acoustic insulation blanket comprises a composite laminate forming a burn through layer.

Another illustrative embodiment of the present disclosure provides a thermal acoustic insulation blanket. The thermal acoustic insulation blanket comprises a coverfilm, a composite laminate forming a burn through layer, and batting between the coverfilm and the composite laminate. The batting comprises an acoustic insulative layer.

A further illustrative embodiment of the present disclosure provides a method. A grommet is sent through a coverfilm, batting, and a composite laminate of a thermal acoustic insulation blanket. The composite laminate forms a burn through layer.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that the Federal Aviation Administration (FAA) regulates all aspects of civil aviation. The illustrative embodiments recognize and take into account that the FAA has regulations covering fire penetration resistance of aircraft thermal acoustic insulation blankets.

The illustrative embodiments recognize and take into account that grommets may be installed through thermal acoustic insulation blankets to provide drainage paths. The illustrative embodiments recognize and take into account that grommets may loosen or fall out of flexible materials. The illustrative embodiments recognize and take into account that reinstalling grommets takes additional manufacturing time.

The illustrative embodiments recognize and take into account that composite materials are tough, light-weight materials created by combining two or more functional components. For example, a composite material may include reinforcing fibers bound in polymer resin matrix. The illustrative embodiments recognize and take into account that the fibers may be unidirectional or may take the form of a woven cloth or fabric.

The illustrative embodiments recognize and take into account that weight is a consideration in the design of components for aircraft. The illustrative embodiments recognize and take into account that reducing the weight of an aircraft reduces operational costs. The illustrative embodiments recognize and take into account that it is desirable to reduce the weight of aircraft components.

The illustrative embodiments recognize and take into account that conventional insulation blankets contacting the composite skin of an aircraft is undesirable. For example, the illustrative embodiments recognize and take into account that conventional insulation blankets contacting the composite skin may trap moisture and lead to corrosion.

The illustrative embodiments recognize and take into account that maintaining a separation between insulation blankets and the composite skin of an aircraft may be desirable. The illustrative embodiments recognize and take into account that maintaining a separation between insulation blankets and the composite skin of an aircraft may reduce or prevent undesirable conditions during operation of the aircraft.

Figure 1:
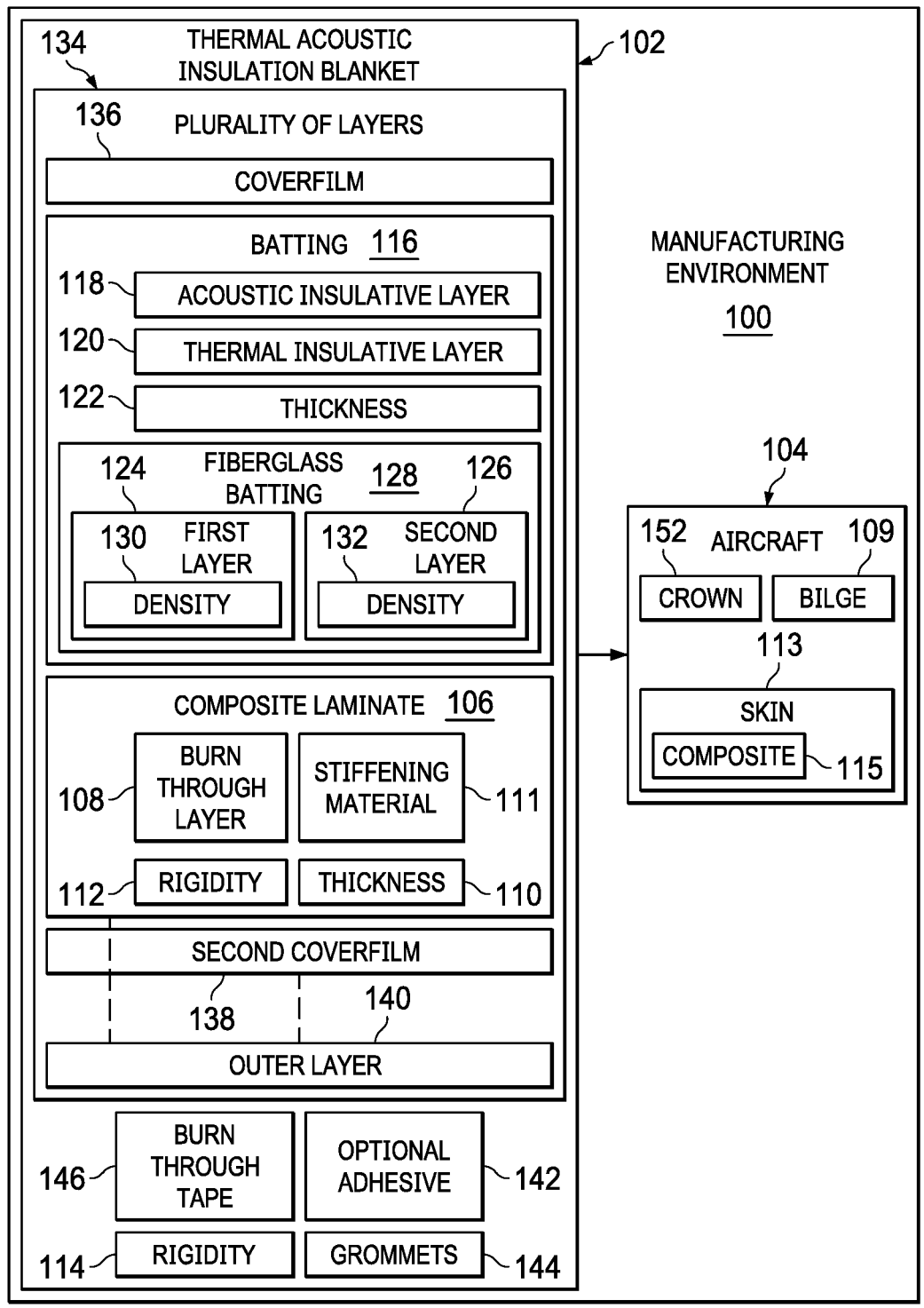
FIG. 1 is an illustration of a block diagram of a manufacturing environment in which a thermal acoustic insulation blanket is positioned in an aircraft in accordance with an illustrative embodiment.

Referring now to the figures and, in particular, with reference to FIG. 1, an illustration of a block diagram of a manufacturing environment in which a thermal acoustic insulation blanket is positioned in an aircraft is depicted in accordance with an illustrative embodiment. Manufacturing environment 100 has thermal acoustic insulation blanket 102. In some illustrative examples, thermal acoustic insulation blanket 102 is manufactured in manufacturing environment 100. In some illustrative examples, thermal acoustic insulation blanket 102 is installed in aircraft 104 in manufacturing environment 100.

Thermal acoustic insulation blanket 102 comprises composite laminate 106 forming burn through layer 108. Burn through layer 108 of thermal acoustic insulation blanket 102 is configured to meet burn through requirements set by the FAA. For example, when thermal acoustic insulation blanket 102 is present in bilge 109 of aircraft 104, burn through layer 108 is configured to meet FAA 25.856(b).

Composite laminate 106 is formed of any desirable type of composite configured to meet burn through requirements. Composite laminate 106 has thickness 110. In some illustrative examples, thickness 110 is configured to meet burn through requirements. In some illustrative examples, thickness 110 is selected to provide rigidity 112.

Composite laminate 106 has rigidity 112. Rigidity 112 increases rigidity 114 of thermal acoustic insulation blanket 102. Rigidity 114 of thermal acoustic insulation blanket 102 is greater than a rigidity of a thermal acoustic insulation blanket without composite laminate 106.

By increasing rigidity 114 of thermal acoustic insulation blanket 102, drainage provided by thermal acoustic insulation blanket 102 may be improved. By increasing rigidity 114 of thermal acoustic insulation blanket 102, thermal acoustic insulation blanket 102 may retain its shape during operation in aircraft 104.

In some illustrative examples, composite laminate 106 further forms stiffening material 111 configured to maintain thermal acoustic insulation blanket 102 away from a skin 113 of aircraft 104. In some illustrative examples, skin 113 is formed of composite 115. In these illustrative examples, skin 113 may be referred to as a composite skin.

When composite laminate 106 forms stiffening material 111, composite laminate provides stiffness to prevent contact between thermal acoustic insulation blanket 102 and composite 115 skin 113.

Thermal acoustic insulation blanket 102 also comprises batting 116. Batting 116 forms acoustic insulative layer 118 and thermal insulative layer 120. Batting 116 has thickness 122. Thickness 122 is configured to provide desirable acoustic insulation and desirable thermal insulation.

Batting 116 comprises any desirable quantity of layers. In some illustrative examples, batting 116 is a single layer. In some illustrative examples, batting 116 comprises more than one layer. As depicted, batting 116 comprises first layer 124 and second layer 126.

In some illustrative examples, first layer 124 of batting 116 is between coverfilm 136 and composite laminate 106. In some illustrative examples, second layer 126 of batting 116 is between coverfilm 136 and composite laminate 106.

Batting 116 may be formed of any desirable material configured to provide desirable acoustic insulation and desirable thermal insulation. In some illustrative examples, batting 116 is formed of fiberglass. In these illustrative examples, batting 116 is fiberglass batting 128.

In some illustrative examples, first layer 124 and second layer 126 are formed of the same material. In other illustrative examples, first layer 124 and second layer 126 are formed of different materials. In some illustrative examples, first layer 124 and second layer 126 are formed of fiberglass batting 128.

First layer 124 has density 130. Second layer 126 has density 132. In some illustrative examples, first layer 124 and second layer 126 have different densities. In these illustrative examples, density 130 of first layer 124 is different from density 132 of second layer 126.

Thermal acoustic insulation blanket 102 comprises plurality of layers 134. Plurality of layers 134 includes composite laminate 106 and batting 116. Plurality of layers 134 further comprises coverfilm 136. Coverfilm 136 provides a moisture barrier for thermal acoustic insulation blanket 102.

In some illustrative examples, plurality of layers 134 further comprises second coverfilm 138. When second coverfilm 138 is present, second coverfilm 138 provides a moisture barrier for thermal acoustic insulation blanket 102.

Plurality of layers 134 may be assembled in any desirable order. In some illustrative examples, second coverfilm 138 is outer layer 140 of thermal acoustic insulation blanket 102. When second coverfilm 138 is outer layer 140, composite laminate 106 is positioned between two layers of coverfilm, coverfilm 136 and second coverfilm 138.

When second coverfilm 138 is present, batting 116 is between the two layers of coverfilm, coverfilm 136 and second coverfilm 138. Batting 116 forms acoustic insulative layer 118.

In some illustrative examples, composite laminate 106 is outer layer 140 of thermal acoustic insulation blanket 102. In some illustrative examples, when composite laminate 106 is outer layer 140, composite laminate 106 is adhered to second coverfilm 138. In these illustrative examples, composite laminate 106 is adhered to second coverfilm 138 using optional adhesive 142.

In other illustrative examples, composite laminate 106 forms outer layer 140 and second coverfilm 138 is not present. In these illustrative examples, composite laminate 106 forms a moisture barrier for thermal acoustic insulation blanket 102.

In some illustrative examples, when composite laminate 106 forms outer layer 140, burn through tape 146 is present. In these illustrative examples, burn through tape 146 is adhered to composite laminate 106. Burn through tape 146 forms seams with other thermal acoustic insulation blankets. The seams formed with burn through tape 146 has desirable flame penetration characteristics.

In some illustrative examples, thermal acoustic insulation blanket 102 comprises coverfilm 136, composite laminate 106 forming burn through layer 108, and batting 116 between coverfilm 136 and composite laminate 106. Batting 116 comprises acoustic insulative layer 118.

In some illustrative examples, thermal acoustic insulation blanket 102 further comprises second coverfilm 138. In these illustrative examples, batting 116 is positioned between coverfilm 136 and second coverfilm 138.

In some illustrative examples, when second coverfilm 138 is present, composite laminate 106 is adhered to second coverfilm 138. In some illustrative examples, when composite laminate 106 is adhered to second coverfilm 138, composite laminate 106 is outer layer 140.

In some illustrative examples, when second coverfilm 138 is present, composite laminate 106 is positioned between coverfilm 136 and second coverfilm 138. When composite laminate 106 is positioned between coverfilm 136 and second coverfilm 138, second coverfilm 138 is outer layer 140.

As depicted, grommets 144 are present in thermal acoustic insulation blanket 102. Grommets 144 extend through each of plurality of layers 134. Grommets 144 extend through each layer of thermal acoustic insulation blanket 102 including coverfilm 136, batting 116, and composite laminate 106. By extending through composite laminate 106, grommets 144 remain within thermal acoustic insulation blanket 102. Rigidity 112 of composite laminate 106 aids in retention of grommets 144 within thermal acoustic insulation blanket 102.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

The illustration of manufacturing environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although thermal acoustic insulation blanket 102 is discussed as being positioned in bilge 109 of aircraft 104, in other illustrative examples, thermal acoustic insulation blanket 102 may be positioned in crown 152 of aircraft 104.

Figure 2:
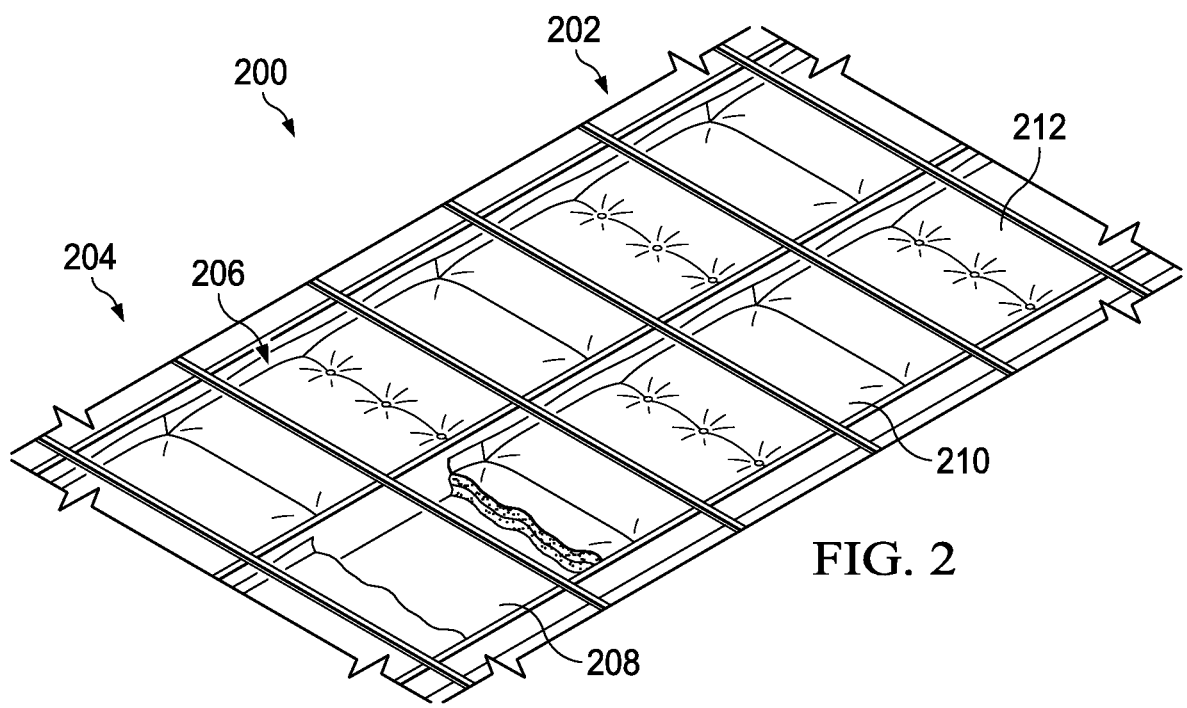
FIG. 2 is an illustration of a top isometric view of thermal acoustic insulation blankets within a bottom of an aircraft in accordance with an illustrative embodiment.

Turning to FIG. 2, an illustration of a top isometric view of thermal acoustic insulation blankets within a bottom of an aircraft is depicted in accordance with an illustrative embodiment. View 200 is a view of bilge 202 of aircraft 204. Bilge 202 is a physical implementation of bilge 109 of FIG. 1.

Thermal acoustic insulation blankets 206 are positioned near composite skin 208 of aircraft 204. Thermal acoustic insulation blanket 210 of thermal acoustic insulation blankets 206 is a physical implementation of thermal acoustic insulation blanket 102 of FIG. 1. In some illustrative examples, thermal acoustic insulation blanket 210 includes burn through tape joining thermal acoustic insulation blanket 210 to thermal acoustic insulation blanket 212.

Figure 3:
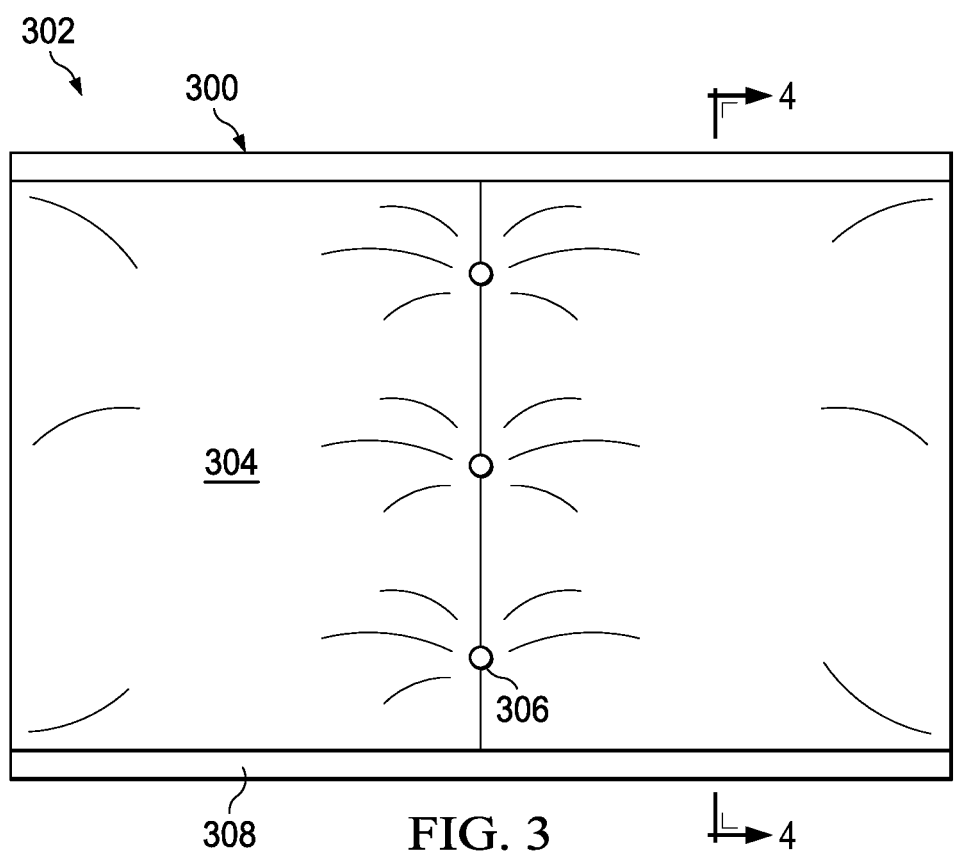
FIG. 3 is an illustration of a top view of a thermal acoustic insulation blanket in accordance with an illustrative embodiment.

Turning to FIG. 3, an illustration of a top view of thermal acoustic insulation blanket is depicted in accordance with an illustrative embodiment. Thermal acoustic insulation blanket 300 is a physical implementation of thermal acoustic insulation blanket 102 of FIG. 1. In some illustrative examples, thermal acoustic insulation blanket 300 is an illustration of thermal acoustic insulation blanket 210 of FIG. 2.

In view 302, coverfilm 304, grommets 306, and tabs 308 are visible. Coverfilm 304 forms a moisture barrier for thermal acoustic insulation blanket 300. Coverfilm 304 covers any desirable quantity of layers, including batting (not depicted), and a composite laminate (not depicted).

Grommets 306 extend through each layer of thermal acoustic insulation blanket 300 including coverfilm 304, the batting (not depicted), and a composite laminate (not depicted). By extending through the composite laminate, grommets 306 remain within thermal acoustic insulation blanket 300. The rigidity of the composite laminate aids in retention of grommets 306 within thermal acoustic insulation blanket 300.

Tabs 308 are used to join thermal acoustic insulation blankets together. In some illustrative examples, tabs 308 include burn through tape. In other illustrative examples, tabs 308 include at least one coverfilm, such as coverfilm 304.

Figure 4:
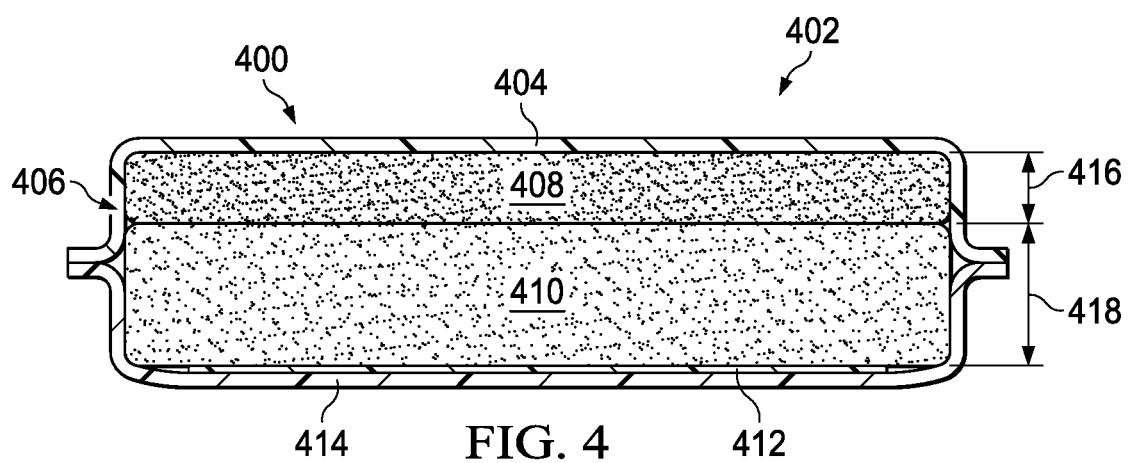
FIG. 4 is an illustration of a cross-sectional view of a thermal acoustic insulation blanket in accordance with an illustrative embodiment.

Turning to FIG. 4, an illustration of a cross-sectional view of a thermal acoustic insulation blanket is depicted in accordance with an illustrative embodiment. Thermal acoustic insulation blanket 400 is a physical implementation of thermal acoustic insulation blanket 102 of FIG. 1. Thermal acoustic insulation blanket 400 may be an implementation of thermal acoustic insulation blanket 210 of FIG. 2. In some illustrative examples, view 402 of thermal acoustic insulation blanket 400 is a view of thermal acoustic insulation blanket 300 of FIG. 3 from cross-sectional view 4-4.

Thermal acoustic insulation blanket 400 includes coverfilm 404, batting 406 including first layer 408 and second layer 410, composite laminate 412, and second coverfilm 414. Coverfilm 404 and second coverfilm 414 act as a moisture barrier. Coverfilm 404 and second coverfilm 414 encompass batting 406 and composite laminate 412.

Batting 406 provides thermal insulation and acoustic insulation. Batting 406 may include any desirable quantity of layers.

As depicted, batting 406 includes first layer 408 and second layer 410. In some illustrative examples, first layer 408 and second layer 410 have different densities. In some illustrative examples, first layer 408 and second layer 410 are formed of different materials.

As depicted, first layer 408 has thickness 416 and second layer 410 has thickness 418. As depicted, thickness 418 is larger than thickness 416. More specifically, thickness 418 is about twice thickness 416. In other non-depicted illustrative examples, thickness 416 may be equal to or greater than thickness 418. Although first layer 408 is depicted as between coverfilm 404 and second layer 410, in some illustrative examples, second layer 410 is between coverfilm 404 and first layer 408.

Batting 406 is formed of any desirable material. In some illustrative examples, batting 406 is formed of fiberglass.

As depicted, composite laminate 412 is positioned between two layers of coverfilm, coverfilm 404 and second coverfilm 414. As depicted, second coverfilm 414 is an outer layer of thermal acoustic insulation blanket 400.

Figure 5:
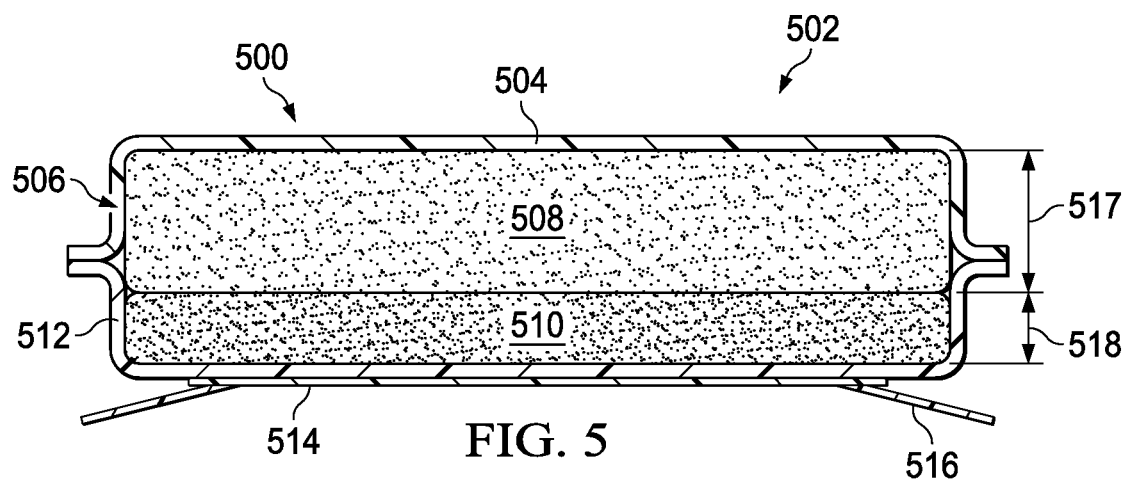
FIG. 5 is an illustration of a cross-sectional view of a thermal acoustic insulation blanket in accordance with an illustrative embodiment.

Turning to FIG. 5, an illustration of a cross-sectional view of a thermal acoustic insulation blanket is depicted in accordance with an illustrative embodiment. Thermal acoustic insulation blanket 500 is a physical implementation of thermal acoustic insulation blanket 102 of FIG. 1. Thermal acoustic insulation blanket 500 may be an implementation of thermal acoustic insulation blanket 210 of FIG. 2. In some illustrative examples, view 502 of thermal acoustic insulation blanket 500 is a view of thermal acoustic insulation blanket 300 of FIG. 3 from cross-sectional view 4-4. Thermal acoustic insulation blanket 500 is an alternative design to thermal acoustic insulation blanket 400 of FIG. 4.

Thermal acoustic insulation blanket 500 includes coverfilm 504, batting 506 including first layer 508 and second layer 510, second coverfilm 512, composite laminate 514, and burn through tape 516. Coverfilm 504 and second coverfilm 512 act as a moisture barrier. Coverfilm 504 and second coverfilm 512 encompass batting 506. Composite laminate 514 is adhered to second coverfilm 512.

Batting 506 provides thermal insulation and acoustic insulation. Batting 506 may include any desirable quantity of layers.

As depicted, batting 506 includes first layer 508 and second layer 510. In some illustrative examples, first layer 508 and second layer 510 have different densities. In some illustrative examples, first layer 508 and second layer 510 are formed of different materials.

As depicted, first layer 508 has thickness 517 and second layer 510 has thickness 518. As depicted, thickness 517 is larger than thickness 518. More specifically, thickness 517 is about twice thickness 518. In other non-depicted illustrative examples, thickness 518 may be equal to or greater than thickness 517. Although first layer 508 is depicted as between coverfilm 504 and second layer 510, in some illustrative examples, second layer 510 is between coverfilm 504 and first layer 508.

Batting 506 is formed of any desirable material. In some illustrative examples, batting 506 is formed of fiberglass.

As depicted, composite laminate 514 is adhered to second coverfilm 512. As depicted, composite laminate 514 is an outer layer of thermal acoustic insulation blanket 500.

Figure 6:
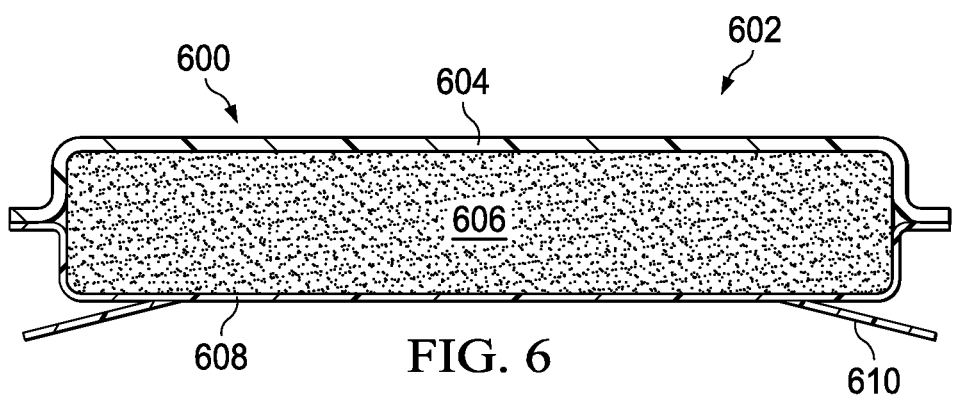
FIG. 6 is an illustration of a cross-sectional view of a thermal acoustic insulation blanket in accordance with an illustrative embodiment.

Turning to FIG. 6, an illustration of a cross-sectional view of a thermal acoustic insulation blanket is depicted in accordance with an illustrative embodiment. Thermal acoustic insulation blanket 600 is a physical implementation of thermal acoustic insulation blanket 102 of FIG. 1. Thermal acoustic insulation blanket 600 may be an implementation of thermal acoustic insulation blanket 210 of FIG. 2. In some illustrative examples, view 602 of thermal acoustic insulation blanket 600 is a view of thermal acoustic insulation blanket 300 of FIG. 3 from cross-sectional view 4-4. Thermal acoustic insulation blanket 600 is an alternative design to thermal acoustic insulation blanket 400 of FIG. 4 and thermal acoustic insulation blanket 500 of FIG. 5.

Thermal acoustic insulation blanket 600 includes coverfilm 604, batting 606, composite laminate 608, and burn through tape 610. Coverfilm 604 and composite laminate 608 act as a moisture barrier. Coverfilm 604 and composite laminate 608 encompass batting 606. Composite laminate 608 is an outer layer of thermal acoustic insulation blanket 600.

Batting 606 provides thermal insulation and acoustic insulation. Batting 606 may include any desirable quantity of layers. As depicted, batting 606 is a single layer.

Batting 606 is formed of any desirable material. In some illustrative examples, batting 606 is formed of fiberglass.

Figure 7:
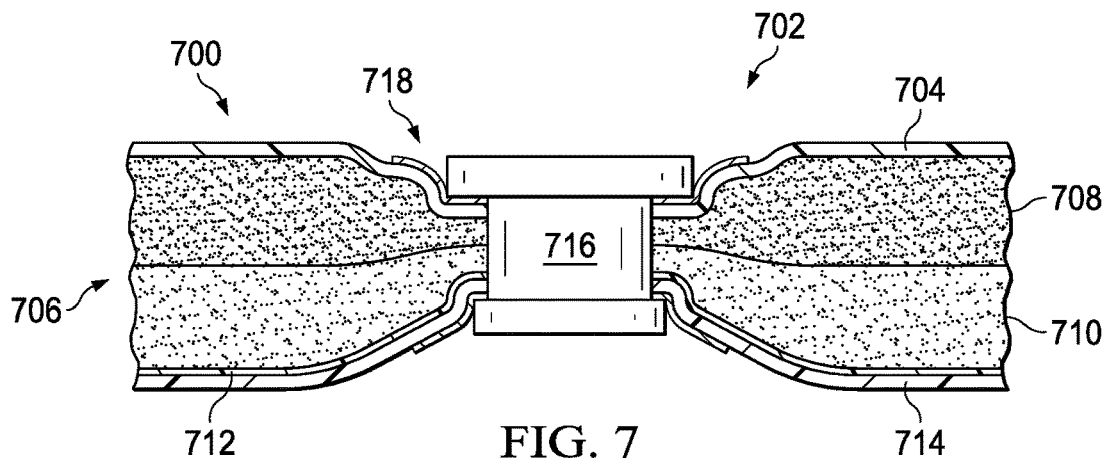
FIG. 7 is an illustration of a cross-sectional view of a grommet in a thermal acoustic insulation blanket in accordance with an illustrative embodiment.

Turning to FIG. 7, an illustration of a cross-sectional view of a grommet in a thermal acoustic insulation blanket is depicted in accordance with an illustrative embodiment. Thermal acoustic insulation blanket 700 is a physical implementation of thermal acoustic insulation blanket 102 of FIG. 1. Thermal acoustic insulation blanket 700 may be an implementation of thermal acoustic insulation blanket 210 of FIG. 2. In some illustrative examples, view 702 of thermal acoustic insulation blanket 700 is a view of thermal acoustic insulation blanket 300 of FIG. 3 from cross-sectional view 4-4. Thermal acoustic insulation blanket 700 is an alternative design to thermal acoustic insulation blanket 400 of FIG. 4, thermal acoustic insulation blanket 500 of FIG. 5, and thermal acoustic insulation blanket 600 of FIG. 6.

Thermal acoustic insulation blanket 700 includes coverfilm 704, batting 706 including first layer 708 and second layer 710, composite laminate 712, and second coverfilm 714. Coverfilm 704 and second coverfilm 714 act as a moisture barrier. Coverfilm 704 and second coverfilm 714 encompass batting 706 and composite laminate 712.

Batting 706 provides thermal insulation and acoustic insulation. Batting 706 may include any desirable quantity of layers.

As depicted, batting 706 includes first layer 708 and second layer 710. In some illustrative examples, first layer 708 and second layer 710 have different densities. In some illustrative examples, first layer 708 and second layer 710 are formed of different materials. Batting 706 is formed of any desirable material. In some illustrative examples, batting 706 is formed of fiberglass.

As depicted, composite laminate 712 is positioned between two layers of coverfilm, coverfilm 704 and second coverfilm 714. As depicted, second coverfilm 714 is an outer layer of thermal acoustic insulation blanket 700.

Grommet 716 extends through plurality of layers 718 of thermal acoustic insulation blanket 700. Grommet 716 extends through coverfilm 704, batting 706, composite laminate 712, and second coverfilm 714.

Grommet 716 extends through each layer of thermal acoustic insulation blanket 700. By extending through composite laminate 712, grommet 716 remains within thermal acoustic insulation blanket 700. The rigidity of composite laminate 712 aids in retention of grommet 716 within thermal acoustic insulation blanket 700.

The illustration of thermal acoustic insulation blanket 700 in FIG. 7 is not meant to imply physical or architectural limitations to the manner in which an illustrative embodiment may be implemented. In some illustrative examples, second coverfilm 714 may not be present. In other illustrative examples, batting 706 may have more than two layers. In some illustrative examples, batting 706 may have only one layer.

Figure 8:
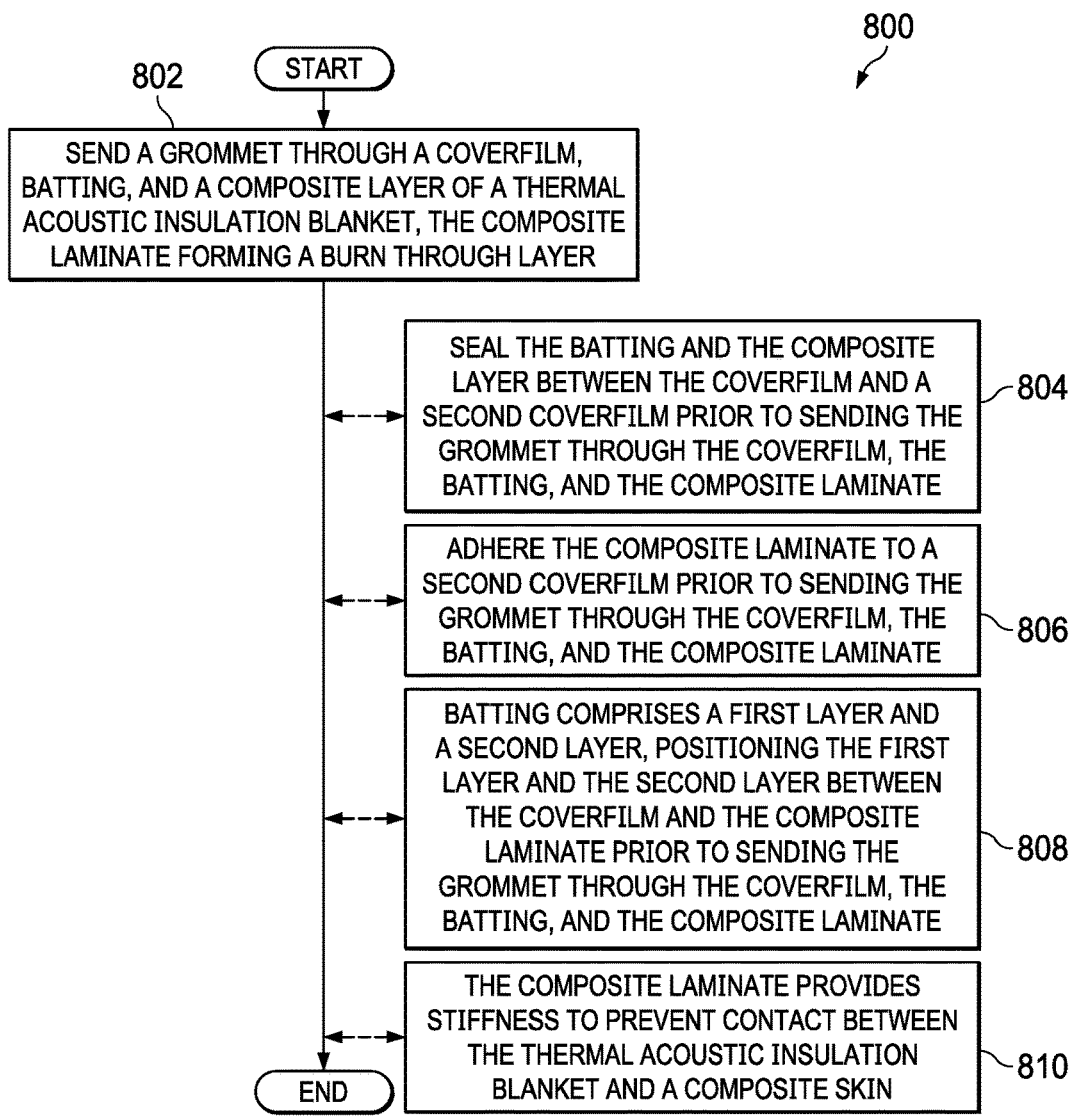
FIG. 8 is an illustration of a flowchart of a method for forming a thermal acoustic insulation blanket in accordance with an illustrative embodiment.

Turning to FIG. 8, an illustration of a flowchart of a method for forming a thermal acoustic insulation blanket is depicted in accordance with an illustrative embodiment. Method 800 may be used to form thermal acoustic insulation blanket 102 of FIG. 1, thermal acoustic insulation blanket 210 of FIG. 2, thermal acoustic insulation blanket 300 of FIG. 3, thermal acoustic insulation blanket 400 of FIG. 4, thermal acoustic insulation blanket 500 of FIG. 5, thermal acoustic insulation blanket 600 of FIG. 6, or thermal acoustic insulation blanket 700 of FIG. 7.

Method 800 sends a grommet through a coverfilm, batting, and a composite laminate of a thermal acoustic insulation blanket, the composite laminate forming a burn through layer (operation 802). Afterwards, method 800 terminates.

In some illustrative examples, method 800 seals the batting and the composite laminate between the coverfilm and a second coverfilm prior to sending the grommet through the coverfilm, the batting, and the composite laminate (operation 804). In some illustrative examples, method 800 adheres the composite laminate to a second coverfilm prior to sending the grommet through the coverfilm, the batting, and the composite laminate (operation 806). In some illustrative examples, the batting comprises a first layer and a second layer, and method 800 positions the first layer and the second layer between the coverfilm and the composite laminate prior to sending the grommet through the coverfilm, the batting, and the composite laminate (operation 808).

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

In some illustrative examples, not all blocks of method 800 are performed. For example, operations 804 through 808 of FIG. 8 are optional.

Figure 9:
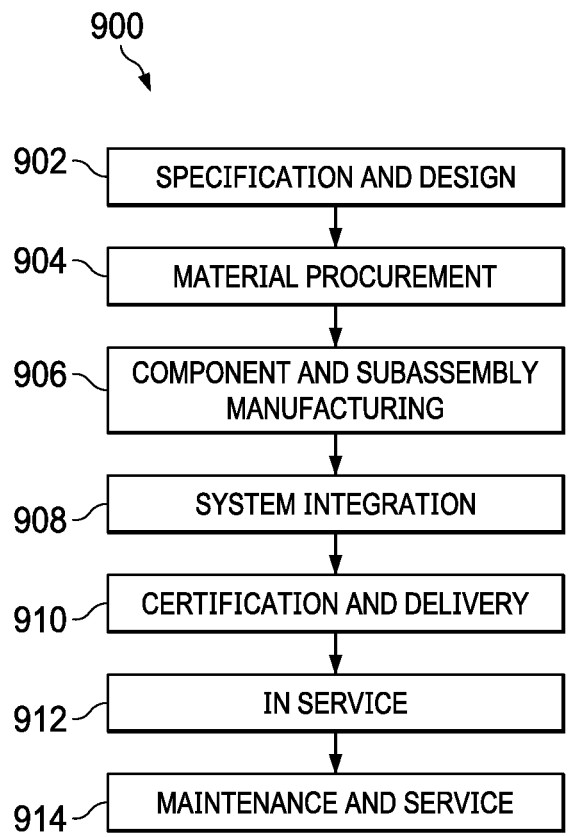
FIG. 9 is an illustration of a block diagram of an aircraft manufacturing and service method in accordance with an illustrative embodiment.
Figure 10:
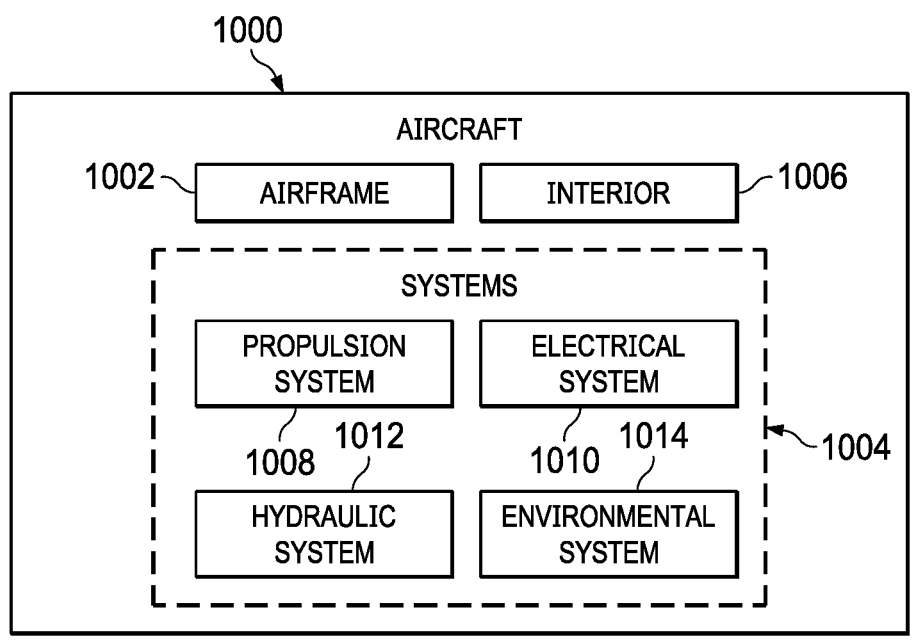
FIG. 10 is an illustration of a block diagram of an aircraft in accordance with an illustrative embodiment.

The illustrative embodiments of the present disclosure may be described in the context of aircraft manufacturing and service method 900 as shown in FIG. 9 and aircraft 1000 as shown in FIG. 10. Turning first to FIG. 9, an illustration of a block diagram of an aircraft manufacturing and service method is depicted in accordance with an illustrative embodiment. During pre-production, aircraft manufacturing and service method 900 may include specification and design 902 of aircraft 1000 in FIG. 10 and material procurement 904.

During production, component and subassembly manufacturing 906 and system integration 908 of aircraft 1000 takes place. Thereafter, aircraft 1000 may go through certification and delivery 910 in order to be placed in service 912. While in service 912 by a customer, aircraft 1000 is scheduled for routine maintenance and service 914, which may include modification, reconfiguration, refurbishment, and other maintenance or service.

Each of the processes of aircraft manufacturing and service method 900 may be performed or carried out by a system integrator, a third party, and/or an operator. In these examples, the operator may be a customer. For the purposes of this description, a system integrator may include, without limitation, any number of aircraft manufacturers or major-system subcontractors; a third party may include, without limitation, any number of vendors, subcontractors, or suppliers; and an operator may be an airline, a leasing company, a military entity, a service organization, and so on.

With reference now to FIG. 10, an illustration of a block diagram of an aircraft is depicted in accordance with an illustrative embodiment. In this example, aircraft 1000 is produced by aircraft manufacturing and service method 900 in FIG. 9 and may include airframe 1002 with a plurality of systems 1004 and interior 1006. Examples of systems 1004 include one or more of propulsion system 1008, electrical system 1010, hydraulic system 1012, and environmental system 1014. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 900. One or more illustrative embodiments may be used during component and subassembly manufacturing 906, system integration 908, or maintenance and service 914 of FIG. 9. For example, thermal acoustic insulation blanket 102 of FIG. 1 may be installed in aircraft 104 during component and subassembly manufacturing 906. As another example, thermal acoustic insulation blanket 102 of FIG. 1 may be manufactured during component and subassembly manufacturing 906. As another example, thermal acoustic insulation blanket 102 of FIG. 1 may be installed in aircraft 104 as a replacement part or as a retrofit part during maintenance and service 914 of FIG. 9.

Apparatuses and methods embodied herein may be employed in manufacturing at least one component of aircraft 1000. For example, thermal acoustic insulation blanket 102 of FIG. 1 is positioned relative to airframe 1002. Thermal acoustic insulation blanket 102 of FIG. 1 is installed in aircraft 1000 to direct moisture away from interior 1006 during operation of aircraft 1000.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A thermal acoustic insulation blanket comprising:
a coverfilm;
batting forming a thermal insulative layer;
a single composite laminate layer forming a burn through layer; and
wherein the composite laminate is a first outer layer of the thermal acoustic insulation blanket and the coverfilm is a second outer layer of the thermal acoustic insulation blanket opposite the first outer layer.

2. The thermal acoustic insulation blanket of claim 1, wherein the batting forms an acoustic insulative layer.

3. The thermal acoustic insulation blanket of claim 2, wherein the batting is formed of fiberglass.

4. The thermal acoustic insulation blanket of claim 3, wherein the batting comprises a first layer and a second layer.

5. The thermal acoustic insulation blanket of claim 1, wherein the coverfilm contacts a first side of the batting and the composite laminate contacts a second side of the batting such that the coverfilm and the composite laminate encompass the batting.

6. The thermal acoustic insulation blanket of claim 1, wherein the composite laminate is adhered to a second coverfilm and further comprising burn through tape adhered to the composite laminate, wherein the burn through tape forms tabs extending from the composite laminate configured to join the thermal acoustic blanket to other thermal acoustic blankets.

7. The thermal acoustic insulation blanket of claim 1, further comprising a grommet extending through the coverfilm, the composite laminate, and the batting.

8. The thermal acoustic insulation blanket of claim 1, further comprising:
the coverfilm sealed to a second coverfilm, wherein the coverfilm and the second coverfilm encompass the batting, and wherein the second coverfilm is positioned between the batting and the composite laminate.

9. A thermal acoustic insulation blanket comprising:
a first coverfilm sealed to a second coverfilm;
a single composite laminate forming a burn through layer; and
batting between the first coverfilm and the composite laminate, wherein the batting comprises an acoustic insulative layer; and
a grommet extending through the first coverfilm, the second coverfilm, the composite laminate, and the batting;
wherein the first coverfilm is a first outer layer of the thermal acoustic insulation blanket and the composite laminate is a second outer layer of the thermal acoustic insulation blanket opposite the first outer layer.

10. The thermal acoustic insulation blanket of claim 9, wherein the batting is positioned between the first coverfilm and the second coverfilm.

11. The thermal acoustic insulation blanket of claim 10, wherein the composite laminate is adhered to the second coverfilm.

12. The thermal acoustic insulation blanket of claim 10, wherein the first coverfilm contacts a first side of the batting and the second coverfilm contacts a second side of the batting.

13. The thermal acoustic insulation blanket of claim 9, wherein the batting is formed of fiberglass.

14. The thermal acoustic insulation blanket of claim 9, wherein the batting forms a thermal insulative layer.

15. The thermal acoustic insulation blanket of claim 9, wherein the batting forms an acoustic insulative layer.

16. The thermal acoustic insulation blanket of claim 9, wherein the batting comprises a first layer and a second layer.

17. A method comprising:
sending a grommet through a coverfilm, batting, and a single composite laminate layer of a thermal acoustic insulation blanket, the composite laminate forming a burn through layer, wherein the composite laminate is a first outer layer of the thermal acoustic insulation blanket and the coverfilm is a second outer layer of the thermal acoustic insulation blanket opposite the first outer layer.

18. The method of claim 17 further comprising:
sealing the batting between the coverfilm and a second coverfilm prior to sending the grommet through the coverfilm, the batting, the composite laminate, and the second coverfilm.

19. The method of claim 17 further comprising:
adhering the composite laminate to a second coverfilm prior to sending the grommet through the coverfilm, the batting, the composite laminate, and the second coverfilm.

20. The method of claim 17, wherein the batting comprises a first layer and a second layer, the method further comprising:
positioning the first layer and the second layer between the coverfilm and the composite laminate prior to sending the grommet through the coverfilm, the batting, and the composite laminate.

* * * * *